United States Patent [19]

Eichenberger et al.

[11] 3,918,866
[45] Nov. 11, 1975

[54] APPARATUS FOR DETECTING DEPOSITS ON CORE RODS

[75] Inventors: Walter Eichenberger, Ocean City; David Mulraney, Hackettstown; Melton E. Reese, Plainfield, all of N.J.

[73] Assignee: Rainville Company, Inc., Middlesex, N.J.

[22] Filed: May 7, 1974

[21] Appl. No.: 467,635

[52] U.S. Cl. ............... 425/136; 425/139; 425/165; 425/387 B
[51] Int. Cl.² .......................................... B29C 17/07
[58] Field of Search ........ 425/DIG. 232, DIG. 203, 425/387 B, 136–139, 154, 165; 264/97, 334

[56] References Cited
UNITED STATES PATENTS

| | | | |
|---|---|---|---|
| 3,784,348 | 1/1974 | Aoki | 264/97 X |
| 3,792,946 | 2/1974 | Zavasnik | 425/387 B X |
| 3,836,300 | 9/1974 | Farrell | 425/DIG. 232 X |

*Primary Examiner*—J. Howard Flint, Jr.
*Assistant Examiner*—Carl Rowold
*Attorney, Agent, or Firm*—Sandoe, Hopgood & Calimafde

[57] ABSTRACT

This stripper, for removing blown plastic articles from the core rods on which the blown articles are formed, has a primary stripper and a secondary stripper. The primary stripper contacts with the articles on the core rods in the usual way, but the secondary stripper is located behind the primary stripper and moves as a unit with the primary stripper except when a piece of plastic adhering to a core rod obstructs the movement of the secondary stripper and stops further movement of the secondary stripper. This causes relative movement of the primary and secondary strippers with respect to one another, and operates an obstruction detector that sounds an alarm or operates an automatic stop for the molding machine with which the stripper is used.

10 Claims, 3 Drawing Figures

U.S. Patent    Nov. 11, 1975    3,918,866
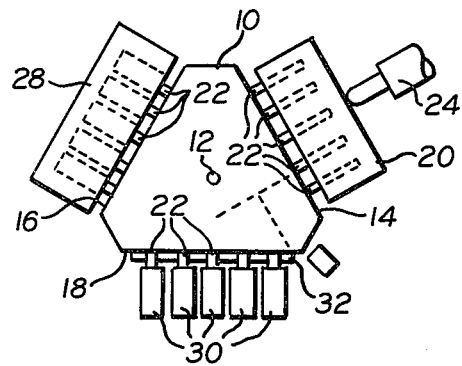
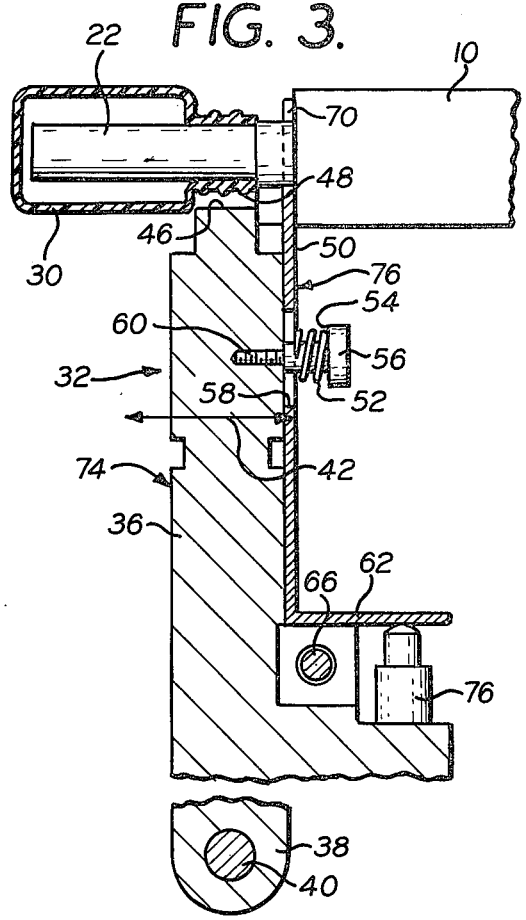
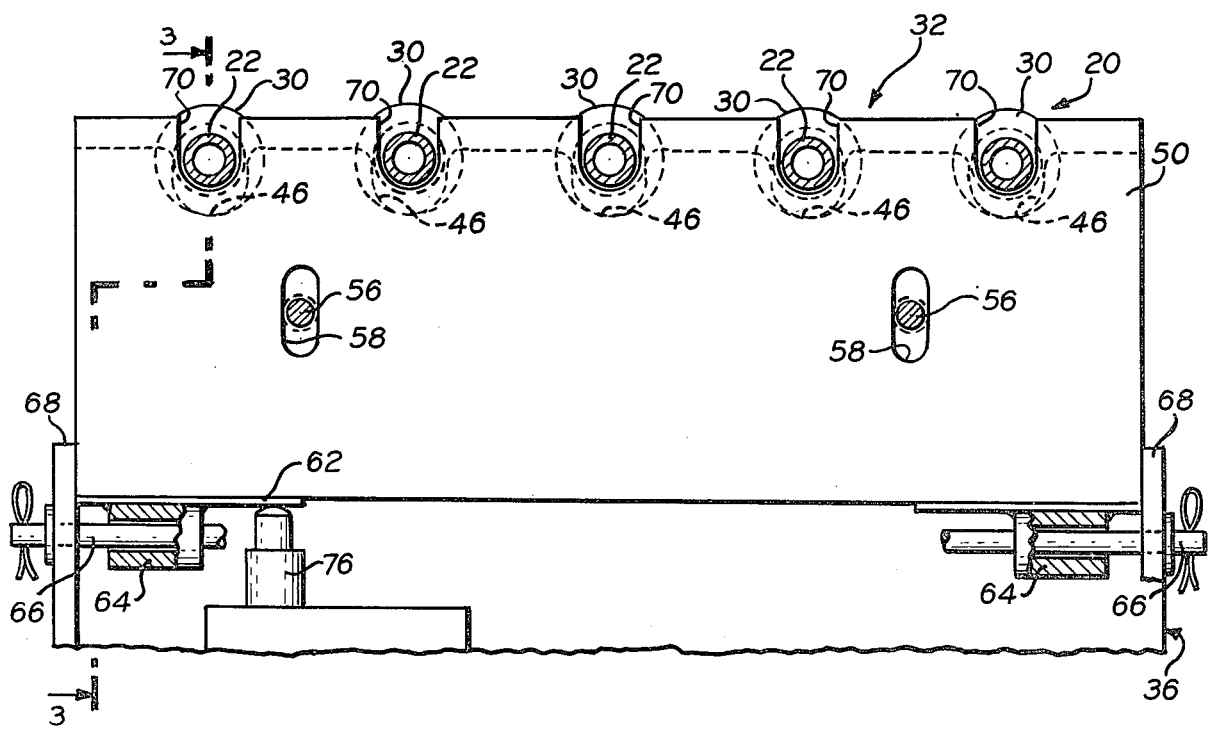

APPARATUS FOR DETECTING DEPOSITS ON CORE RODS

BACKGROUND AND SUMMARY OF THE INVENTION

Blow molding machines commonly have a table with a plurality of faces and have core rods extending from the respective faces. The table moves to carry the core rods successively to a supply station at which plastic material is applied to each core rod to form a parison on the core rod. The table then carries the coated core rods to a blowing station; and after the articles are blown, the core rods are carried to a stripper station.

At the stripper station the blown articles are pushed off the core rods and then the core rods are carried to the supply station to receive new parisons. One of the hazards with such machines is that a portion of the parison will sometimes adhere to the core rod and not be stripped from the core rod when the article is pushed off the core rod by the stripper. If a core rod with such an obstruction on it is moved to an injection station, and an injection mold closes on the core rod, there is danger of the injection mold being broken; or if the mold does not close fully, then there may be dangerous flashing of the injection mold at the next injection operation.

Detectors are used in positions where they are close to the core rods as the core rods pass from a stripping station to a supply or injection station. These detectors are moved, if an obstruction on a core rod strikes them, and this movement of the detectors can be used to sound an alarm or to operate an automatic stop for the molding machine.

The detectors are at fixed locations along the path of movement of the core rods; but since the table that carries the core rods is not round, the core rods near the center of a face of the table are further from the detectors than are the core rods which are nearer to the ends of the face. With molding machines that have very short core rods it is impossible for such detectors to operate satisfactorily.

This invention provides a different technique for detecting obstructions left on the core rods after a stripping operation. A secondary stripper follows a primary stripper which operates in the usual way. The secondary stripper has less clearance from the core rods than the primary stripper and moves along the core rods from a location adjacent the face of the table as the primary stripper displaces blown articles from the core rods. If any part of the parison adheres to the core rod and fails to strip as a result of the operation of the primary stripper, then the secondary stripper contacts with the obstruction and cannot move further along the core rod. Continued movement of the primary stripper without the following of the secondary stripper causes a relative movement between the primary and secondary stripper which operates a detector for sounding an alarm for triggering an automatic stop.

One feature of the invention is the simple construction of the secondary stripper which can be applied without redesign of the conventional apparatus used at the stripper station of a blow molding machine.

Other objects, advantages and features of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view showing the table of a blow molding machine and the position of each of the operating stations around the table, and also illustrating the way in which the core rod moves inwardly away from an obstruction detector as the table turns;

FIG. 2 is a diagrammatic rear view of a stripper made in accordance with this invention; and FIG. 3 is a sectional view taken on the line 3—3 of FIG. 2.

DESCRIPTION OF PREFERRED EMBODIMENT

The molding apparatus shown in FIG. 1 includes a table 10 which rotates about a center post 12. The table 10 has three faces 14, 16 and 18 which are at 60° angular relationship to one another. The vertices that would be at the angles of the triangle formed by the faces 14–18 are cut off, as shown, in order to reduce the radial extent of the table 10 beyond the center post 12.

The apparatus shown in FIG. 1 has three operational stations corresponding to the three faces of the table 12. The first operational station includes an injection mold 20 at which parisons are applied to core rods 22 which extend from the face 14. Molten plastic is supplied to the injection mold 20 from a plasticizer 24.

The core rods 22 can be coated with plastic by means other than an injection mold 20 and this injection mold is representative of means for applying a parison to the individual core rods 22 at what may be considered a "supply" station.

While parisons are being applied to the core rods 22 at the mold 20 other core rods 22 at a blowing mold 28 are subjected to air pressure, or other blowing agent, which expands the parisons in the blow mold 28 to the shape determined by the cavities of the blow mold 28.

Blown articles 30 on other core rods 22 are located at a stripper station which includes a stripper 32, best shown in FIGS. 2 and 3, for displacing the blown article 30 from the core rods 22.

After each of the operations at the different operational stations has been performed simultaneously with the other operations, the molds 20 and 28 open, and the center post 12 lifts the table 10 sufficiently for the core rods and the articles carried by them to clear both sections of the molds 20 and 28, and to also lift the core rods out of open ended grooves in the stripper 32, the operation of which will be explained in connection with FIGS. 2 and 3.

The table 10 then turns through an angle of 60° and lowers into its original position so that the core rods are in the fixed portions of the molds 20 and 28. The molds 20 and 28 then close and the operations are repeated. This is conventional molding machine operation and is well understood in the art. The explanation here is to illustrate the environment in which this invention is used and with which it is combined.

FIGS. 2 and 3 show the construction of the stripper 32. It includes a main frame 36 having bearings 38 located at its lower end for angular movement about an axle 40. This axle 40 is held in a fixed position and constitutes part of the fixed structure of the molding machine. The main frame 36 has a limited angular movement about the axis of the axle 40 and is moved back and forth as indicated by the arrow 42. This back and forth movement is obtained by motor means which operate in timed relation with the other operations of the machine and which are conventional and well understood so that their illustration is not necessary to a complete understanding of this invention.

At the upper end of the main frame 36 there is a portion of the main frame that has open-ended depressions 46 into which the core rods 22 descend when the table 10 is lowered into position for the next operation at each of the operational stations.

The core rod 22 is shown, in FIG. 3, with a blown article 30 illustrated in section.

The open ended depression 46 is wide enough to provide clearance for a neck portion 48 of the blown article 30. FIG. 3 shows the position of the core rod 22, blown article 30 and the neck portion 48 with respect to the depression 46 of the stripper as of the time that the table 10 brings the core rods 22 into their initial relationship with the stripper.

The next operation at the stripper station is an angular movement of the main frame 36 in a counterclockwise direction about its axle 40. This causes the sides of the depression 46 to come in contact with the shoulder portion of the blown article 30 beyond the neck portion 46, and continued counterclockwise movement of the main frame 36 pushes the blown article 30 from the core rod 22 so that the article drops into a container at the stripper station and just beyond the ends of the core rods 22. This is a conventional stripper operation.

The main frame 36 with the depressions 46 in its upper face, may be considered a primary stripper, and will be so referred to in this specification and in the claims. This invention provides also a secondary stripper which consists of a plate 50 held against the back of the main frame 36 by springs 52 which are compressed between a shoulder 54 of a bolt 56 which extends through slots 58. This bolt 56 has a threaded end portion 60 that screws into the main frame 36.

At the lower end of the plate 50, it is bent to provide a horizontally extending portion 62, and there are bearing blocks 64 welded to the horizontal portion 62. A shaft 66 extends through the bearing blocks 64 and into a part 68 of the main frame 36.

At the upper end of the plate 50 there are open-ended depressions 70 which are in alignment with the open-ended depressions 46 of the primary stripper, but which are narrower than the depressions 46, as will be evident from FIG. 2. The upper end of the plate 50 is beyond the neck portion 48 of the article 30. Thus the sides of the depressions 70 extend upwardly along portions of the core rods which never have any plastic material applied to them. The clearance between the sides of the depressions 70 and the adjacent core rod surface is limited so that these edges of the depressions 70 will contact with any plastic obstruction left on the core rod from the neck portion 48 as the result of imperfect stripping of an article 30 from the core rod.

In the normal operation of the stripper, the secondary stripper, designated by the reference character 76, has on relative movement with respect to the primary stripper, designated by the reference character 74. The springs 52 hold the plate 50 of the secondary stripper 76 in contact with the back of the main frame 36 of the primary stripper 74 so that they move as a unit.

In the event that the edges of the depression 70 of the secondary stripper 76 strike against an obstruction caused by plastic adhered to the neck portion of the core rod, then the plate 50 can no longer move as a unit with the primary stripper 74 as the primary stripper moves counterclockwise in FIG. 3. This causes the primary stripper 74 to move independently of the secondary stripper 76 and causes relative movement of the shaft 66 with respect to the bearing blocks 64 so that the bolts 56 move to the left, compressing the springs 52, and a detector switch 78, which is rigidly secured to the main frame 36, moves upwardly with respect to the stationary horizontal portion 62 of the stalled seconary stripper.

This relative movement of the detector switch 78 with respect to the horizontal portion 62 of the secondary stripper causes the switch 78 to operate to sound an alarm or trigger an automatic stop or otherwise designate the detection of an obstruction on the core rod.

FIG. 2 shows the slots 58 to be elongated in a direction transverse of the axis of the shaft 62 so as to permit angular movement of the plate 50 and main frame 36 with respect to one another. From the description of the operation in FIG. 3, it will be apparent that the switch 78 is representative of an obstruction detector and that the horizontally extending portion 62 of the secondary stripper may be considered as representative of an operating element for the obstruction detector as the latter moves with the primary stripper while the secondary stripper remains stalled as the result of an obstruction on a core rod.

The preferred embodiment of the invention has been illustrated and described, but changes and modifications can be made and some features can be used in different combinations without departing from the invention as defined in the claims.

What is claimed is:

1. In a molding machine, a table having a plurality of faces in angular relation to one another, core rods extending from said faces, operational stations including a plastic supply station at which core rods are coated with a parison, a blow molding station, and a stripper station, means for moving the table to shift the core rods to successive stations, a primary stripper at the stripper station with surfaces that contact with blown articles made from said parisons, and a secondary stripper behind the primary stripper and with surfaces that follow the primary stripper, the primary and secondary strippers having means to allow for relative movement toward and from one another in the direction of extent of the core rod when there is an obstruction on the core rod at the stripper station, means for moving the primary and secondary strippers simultaneously lengthwise of the core rod, said surfaces that follow the primary stripper being positioned to contact with any obstruction formed by a residual portion of a parison that is not removed from the core rods by the operation of the primary stripper, and an obstruction detector operated by said movement of the strippers relative to one another.

2. The molding machine described in claim 1 characterized by the primary stripper having an open-ended depression therein for each of the core rods that extend from one of the respective faces of the table, the width of the depression being less than the width of the blown articles on the core rod, and the secondary stripper having open-ended depressions therein narrower than the depressions of the primary stripper and of a width only slightly greater than the width of the core rod at the region of the core rod that extends into the depression in the secondary stripper.

3. The molding machine described in claim 2 characterized by bearings on which the primary stripper has angular movement about an axis, and other bearings on which the secondary stripper has angular movement about a different axis.

4. The molding machine described in claim 3 characterized by the other bearings being carried by the primary stripper and movable as a unit therewith, and the second stripper being movable as a unit with the primary stripper except when the secondary stripper is moving angularly about said other bearings.

5. The molding machine described in claim 4 characterized by a spring that holds the secondary stripper against the back of the primary stripper during normal stripper action, the secondary stripper stopping when it strikes a plastic obstruction adhered to a core rod, and having relative movement on said other bearings as the primary stripper continues to move, and an obstruction detector carried by the primary stripper and actuated by said relative movement.

6. The molding machine described in claim 5 characterized by the primary stripper and the secondary stripper each including a plate that has open-ended depressions for all of the core rods whereby relative movement of the secondary stripper about said other bearings operates the detector if there is an obstruction on any one of the core rods.

7. The molding machine described in claim 1 characterized by resilient means urging the secondary stripper to move as a unit with the primary stripper.

8. The molding machine described in claim 7 characterized by the detector comprising a switch, an operating element having a surface that contacts with a surface of the switch to operate such switch, one of the surfaces being carried by the switch and the other surface being carried by one of the strippers, said surfaces being in position to operate the switch when there is a relative movement of one stripper with respect to the other.

9. The molding machine described in claim 8 characterized by the switch carried by the primary stripper at the back thereof, the secondary stripper having a bell crank construction at its lower end, one arm of the bell crank extending across the switch in position to operate the switch when the primary stripper moves and an obstruction on the core rod prevents the secondary stripper from following the movement of the primary stripper.

10. The molding machine described in claim 1 characterized by the second stripper being a plate that extends parallel to the face of the table from which the core rods at the station extend, said plate being relatively thin and of less stiffness than the primary stripper, and spaced bolts secured to the back of the primary stripper and extending through slots in the secondary stripper, which slots have their elongation extending in a direction transverse of the axis of the angular movement of the secondary stripper, shoulders on the bolts on the side of the secondary stripper that faces away from the primary stripper, and springs surrounding the bolts and compressed between the secondary stripper and the shoulders on the bolts for urging the secondary stripper toward the primary stripper.

* * * * *